(12) United States Patent
Takagaki

(10) Patent No.: US 6,871,048 B2
(45) Date of Patent: *Mar. 22, 2005

(54) MOBIL COMMUNICATION APPARATUS AND INFORMATION PROVIDING SYSTEM USING THE MOBILE COMMUNICATION APPARATUS

(75) Inventor: Hirokazu Takagaki, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/300,671

(22) Filed: Apr. 27, 1999

(65) Prior Publication Data

US 2002/0065066 A1 May 30, 2002

(30) Foreign Application Priority Data

Apr. 28, 1998 (JP) .......................................... 10-117971

(51) Int. Cl.$^7$ ................................................. H04B 7/00
(52) U.S. Cl. ................. 455/66.1; 455/412.1; 455/556.1
(58) Field of Search ................................ 455/412, 413, 455/414, 415, 418, 466, 558, 410, 66.1, 39, 412.1, 414.1, 556.1

(56) References Cited

U.S. PATENT DOCUMENTS

| | | | | |
|---|---|---|---|---|
| 5,592,555 A | * | 1/1997 | Stewart | 380/247 |
| 5,594,779 A | * | 1/1997 | Goodman | 455/3.04 |
| 5,694,455 A | * | 12/1997 | Goodman | 455/412 |
| 5,729,540 A | * | 3/1998 | Wegrzyn | 370/336 |
| 5,797,098 A | * | 8/1998 | Schroeder et al. | 455/464 |
| 5,940,769 A | * | 8/1999 | Nakajima et al. | 455/509 |
| 6,029,064 A | * | 2/2000 | Farris et al. | 455/412 |
| 6,052,606 A | * | 4/2000 | Bowen | 455/566 |
| 6,145,046 A | * | 11/2000 | Jones | 710/100 |
| 6,151,491 A | * | 11/2000 | Farris et al. | 455/412 |
| 6,169,897 B1 | * | 1/2001 | Kariya | 455/426 |
| 6,246,672 B1 | * | 6/2001 | Lumelsky | 370/310 |
| 6,516,466 B1 | * | 2/2003 | Jackson | 725/62 |

FOREIGN PATENT DOCUMENTS

| | | | | |
|---|---|---|---|---|
| WO | WO 97/26744 | * | 7/1997 | H04M/1/00 |
| WO | WO 97/28649 | * | 8/1997 | H04N/7/167 |

* cited by examiner

*Primary Examiner*—Sonny Trinh
(74) *Attorney, Agent, or Firm*—Frommer Lawrence & Haug LLP; William S. Frommer; Bruno Polito

(57) ABSTRACT

There are disclosed a mobile communication apparatus and an information providing system using the mobile communication apparatus in which a user of the mobile communication apparatus can obtain information output of desired contents at a desired time without carrying other devices. In this system, the side of the mobile communication apparatus requests a predetermined opposite party of communication to transmit desired information such as music data by using a transmitter. When a receiver receives information transmitted in response to the request, the received information is stored in a memory, and at an arbitrary time thereafter, the information in the memory is read by a recording/reproducing section, and is outputted and reproduced to the user from an input/output section.

12 Claims, 3 Drawing Sheets

MOBIL COMMUNICATION APPARATUS AND INFORMATION PROVIDING SYSTEM USING THE MOBILE COMMUNICATION APPARATUS

BACKGROUND OF THE INVENTION

1. Field of the Invention

The present invention relates to a mobile communication apparatus for carrying out communication through radio waves. The present invention also relates to an information providing system using the mobile communication apparatus.

2. Description of the Related Art

In recent years, a mobile communication apparatus enabling communication through radio waves, such as a cellular mobile phone or PHS (Personal Handyphone System), has come into wide use. For the purpose of using the advantage of carrying out wireless communication, the mobile communication apparatus is designed to become small and lightweight for the convenience of carrying. As communication to be carried out by the mobile communication apparatus, although communication of audio information is the mainstream, the mobile communication apparatus recently has come to meet composite and multiple data communication of character information, image information, video information, or the like.

Although a conventional mobile communication apparatus is normally used while being carried by a user, it can not be absolutely said that a time actually used by the user is long. That is, normally, the mobile communication apparatus is in the state of stand-by for almost of the time used, and a ratio of time when communication is actually carried out is not absolutely high.

Besides, when the time of going to the office/school is considered as an example, a user of the mobile communication apparatus often carries, in addition, a portable sound device for reproducing music data recorded on a magnetic tape, an optical disc, a magneto-optical disc, or the like, or a portable radio receiver for receiving AM broadcasting, FM broadcasting, TV sound, or the like. This is because the user desires to obtain information such as music, news and so on of desired contents at a desired time.

SUMMARY OF THE INVENTION

In view of the fact that usage efficiency of a mobile communication apparatus is not absolutely high, and a user carries a portable sound device, a portable radio receiver, or the like in addition to the mobile communication apparatus, an object of the present invention is to provide a mobile communication apparatus and an information providing system using the mobile communication apparatus in which the functions of these devices are combined so that the user of the mobile communication apparatus can obtain information of desired contents at a desired time without additionally carrying other devices.

In order to achieve the above object, according to an aspect of the present invention, a mobile communication apparatus comprises communication means for carrying out communication with a party of communication on a public line network through radio waves; transmission request means for requesting a predetermined party to transmit desired information by using the communication means; storage means for storing information when the communication means receives the information transmitted in response to request from the transmission request means; and output means for outputting the information stored in the storage means at an arbitrary time.

According to the mobile communication apparatus of the foregoing structure, if a user requests transmission of desired information by use of the transmission request means in advance, and the information transmitted in response to the request is stored in the storage means, it becomes possible to output the desired information in the storage means from the output means at a subsequent arbitrary time.

According to another aspect of the present invention, an information providing system using a mobile communication apparatus includes an information transmitting station as a transmitter of information provided on a public line network and a mobile communication apparatus for carrying out communication with the information transmitting station through radio waves, wherein the information transmitting station comprises information transmission means for transmitting information specified by a transmission request to the mobile communication apparatus as a requester when the transmission request for information is issued from the mobile communication apparatus; and wherein the mobile communication apparatus comprises transmission request means for requesting the information transmitting station to transmit desired information; storage means for storing information when receiving the information transmitted from the information transmitting station; and output means for outputting the information stored in the storage means at an arbitrary time.

According to the information providing system of the foregoing structure, when the transmission request for information is issued from the mobile communication apparatus, the information transmitting station transmits the information specified by the transmission request to the mobile communication apparatus as the requester. On the other hand, at the side of the mobile communication apparatus, when the information from the information transmitting station is received, the storage means stores the information, and the output means outputs the information. However, the output means outputs the information stored in the storage means at an arbitrary time. Thus, in this information providing system, when the user of the mobile communication apparatus requests the side of the information transmitting station to transmit desired information in advance, and the information stored in the storage means in response to the request is outputted by the output means at the desired time, the user of the mobile communication apparatus is provided with the information output of the desired contents at the desired time.

DETAILED DESCRIPTION OF THE PREFERRED EMBODIMENTS

A mobile communication apparatus of the present invention and an information providing system using the mobile communication apparatus will be described below with reference to the drawings.

Here, prior to the explanation of the mobile communication apparatus, the information providing system using this mobile communication apparatus will be described.

Figure 2:
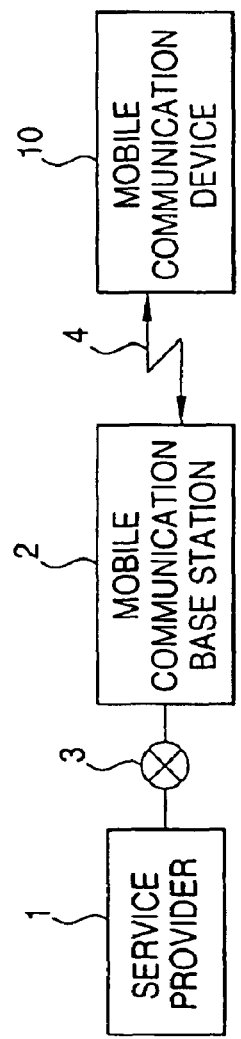
FIG. 2 is a block diagram showing a schematic structure of an information providing system using a mobile communication apparatus of the invention.

The information providing system of this embodiment comprises, as shown in FIG. 2, a service provider 1, a mobile communication base station 2, and a mobile communication apparatus 10.

The service provider 1 functions as an information transmitting station for transmitting predetermined information to the mobile communication apparatus 10. For that purpose, the service provider 1 has a function as information transmitting means realized by a computer or the like. By using this function, when a transmission request for information is issued from the mobile communication apparatus 10, the information specified by the transmission request is transmitted to the mobile communication apparatus 10 as a requester. As the information transmitted from the service provider 1, there is, for example, information of music or news (hereinafter referred to as music data or news data).

The mobile communication base station 2 is connected with the service provider 1 through a public line network 3, and is for realizing radio communication 4 with the mobile communication apparatus 10.

The mobile communication apparatus 10 includes a portable telephone or the like for sending and receiving information through radio communication, and is designed to become small and lightweight so that it is conveniently carried by a user. The system of radio communication carried out by this mobile communication apparatus 10 may be, for example, CDMA (Code Division Multiple Access), PDC (Personal Digital Cellular; digital automobile telephone system), PHS (Personal Handyphone System) or the like. In the case where information transmitted from the service provider 1 is music data of high quality, since the amount of data becomes large, CDMA (64 kbps) or PHS (32 kbps) capable of carrying out high speed communication is suitable.

Figure 1:
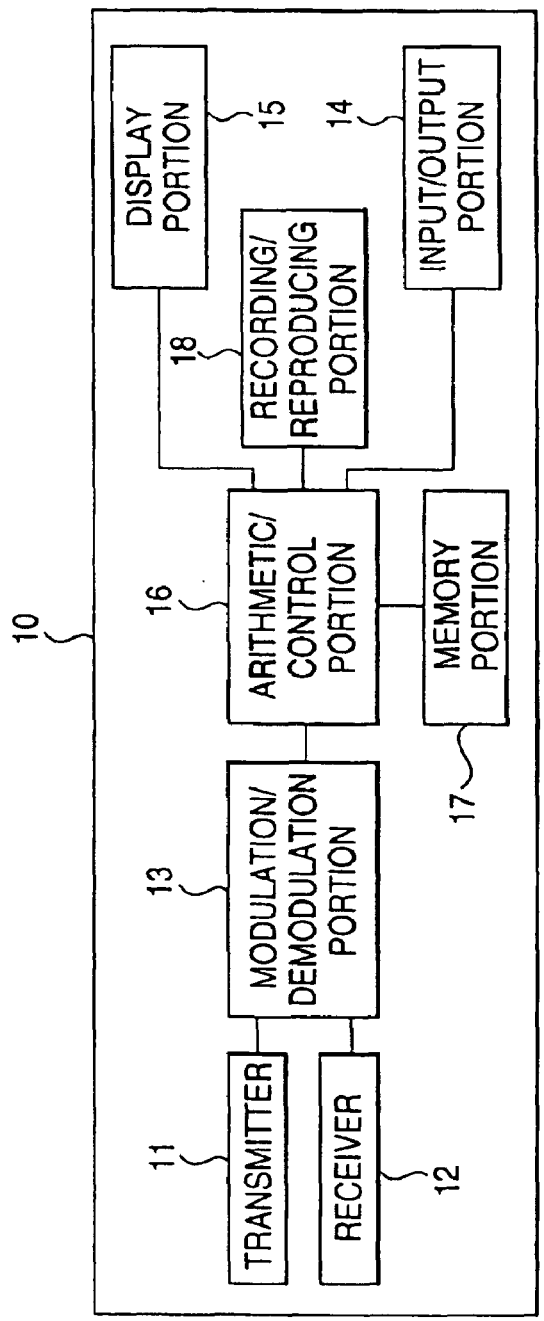
FIG. 1 is a block diagram showing a schematic structure of an example of a mobile communication apparatus of the invention.

The mobile communication apparatus 10 used in the information providing system of such a structure includes, as shown in FIG. 1, a transmitter 11, a receiver 12, a modulation/demodulation section (portion) 13, an input/output section (portion) 14, a display section (portion) 15, an arithmetic/control section (portion) 16, a memory section (portion) 17, and a recording/reproducing section (portion) 18.

The transmitter 11 and the receiver 12 function as communication means for realizing radio communication with the mobile communication base station 2. As information sent and received through the transmitter 11 and the receiver 12, there are, for example, music data or news data transmitted from the service provider 1, and an information transmission request as information for requesting transmission of such data.

The modulation/demodulation section 13 carries out modulation/demodulation of the information transmitted by the transmitter 11 and the information received by the receiver 12.

The input/output section 14 includes a keypad operated by a user, a speaker or earphone (headphone) for outputting information to the user, and the like. The input/output section is used as transmission request means for requesting the service provider 1 to transmit desired music data or news data, or functions as output means for outputting the music data or news data from the service provider 1 to the user.

The display section 15 is made of an LCD (Liquid Crystal Display) and the like, and is for displaying necessary information (operation contents at the input/output section 14, and the like) to the user.

That is, the input/output section 14 and the display section 15 are for establishing the user interface between the mobile communication apparatus 10 and its user. When a touch sensor or the like is used, the display section 15 can be used also as a part of the input/output section 14.

The arithmetic/control section 16 is made of a microprocessor and the like, and is for carrying out operation control and communication control of the entire of the mobile communication apparatus 10. As the operation control or communication control carried out by the arithmetic/control section 16, there are, for example, a process for causing the transmitter 11 to transmit an information transmission request to the service provider 1 in accordance with instructions from the user using the input/output section 14, and a process for causing the input/output section 14 to output the music data or news data received by the receiver 12 from the service provider 1.

The memory section 17 functions as storage means for storing the music data or news data from the service provider 1. As the memory section 17, it is conceivable to use a magnetic tape, a magneto-optical disk, or the like as a storage medium. However, when portability (small and lightweight) and saving of power consumption are taken into consideration, it is preferable to use a semiconductor memory as the storage medium. Moreover, when the memory section 17 is formed of an IC card having a built-in nonvolatile flash ROM (Read Only Memory) capable of electrically reading and writing, and the memory section 17 is structured such that it can be freely attached to and detached from the mobile communication apparatus 10 through a card connector and the like, it becomes more preferable from the reason described later. If sound quality to the same degree as the case of a normal optical disc or the like is reproduced, it can store music data of about 10 minutes in the case where the memory section 17 has a storage capacity of 70 to 80 M bit and since the transmission speed of music data is 128 k bit/sec.

The recording/reproducing section 18 is made of a microprocessor and the like, and is for controlling storage of music data or news data into the memory section 17 and reading of the music data or news data from the memory section 17. The recording/reproducing section 18 may be such one as to perform data compression processing, data expansion processing, and the like to the music data or news data being or to be stored in the memory section 17 as the need arises.

Next, an example of processing operations in the thus structured mobile communication apparatus 10 and the information providing system will be described.

Figure 3:
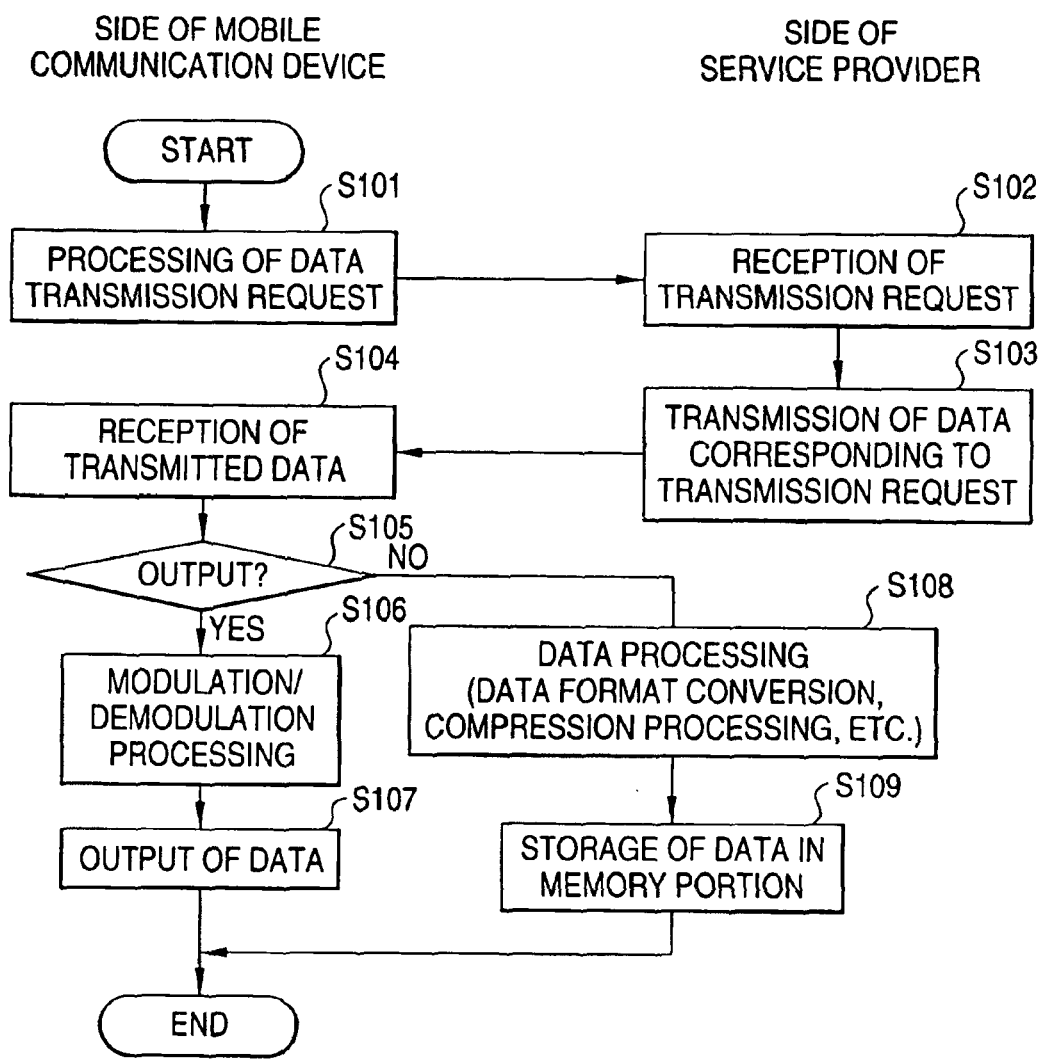
FIG. 3 is a flowchart showing an example of processing operations in the case where information is provided to the of a mobile communication apparatus in an information providing system of the invention.

In the information providing system, as shown in the flowchart of FIG. 3, first, processing of data transmission request is carried out at the mobile communication apparatus 10 (step 101, in the following, the term "step" will be abbreviated as S). That is, at the mobile communication apparatus 10, the user uses the input/output section 14 to input the access number of the service provider 1 and to specify desired information. The arithmetic/control section 16 generates an information transmission request on the basis of the input contents and specified contents, and further, the transmitter 11 transmits the information transmission request to the service provider 1.

At this time, it is assumed that the telephone number of the service provider 1 is inputted as the access number at the input/output section 14. However, other than the telephone number, it is also possible to input "specific number" set by a communication carrier or URL (Uniform Resource Locator) address. Designation of the desired information is carried out by, for example, specifying the number using the input/output section 14 or by selection from a menu screen displayed on the display section 15.

On the other hand, at the service provider 1, when the information transmission request is transmitted from the transmitter 11 of the mobile communication apparatus 10, the information transmission request is received through the mobile communication base station 2 (S102), and in response to the received information transmission request, music data or news data specified by the information transmission request are transmitted to the mobile communication apparatus 10 as a requester (S103).

By this, at the mobile communication apparatus 10, the receiver 12 receives the music data or news data transmitted from the service provider 1 (S104), and as a result, the music data or news data corresponding to the request of the user are downloaded from the service provider 1. In the case of the communication system of, for example, CDMA, since the transmitting speed of music data is 64 kbps, the time required for downloading is about 3 minutes for music of about 3 minutes. If the sound quality is the same as voice communication through the telephone, since the transmission speed is 8 kbps, downloading for news data of about 10 minutes is completed in about one minute and 15 seconds.

When the receiver 12 receives the music data or news data, at the mobile communication apparatus 10, the arithmetic/control section 16 performs the following control processing. That is, the arithmetic/control section 16 causes the display portion 15 to display the reception of the music data or news data to notify the user of the reception, and judges whether or not the received music data or news data should be outputted at this time (S105). This judgement may be carried out based on, for example, the fact whether or not a predetermined operation has been carried out by the user at the input/output section 14.

Here, in the case where judgement to output the data is made, the arithmetic/control section 16 causes the input/output section 14 to output the music data or news data (S107) after modulation/demodulation is carried out by the modulation/demodulation section 13 (S106).

On the other hand, when the arithmetic/control section 16 judges that the data should not be outputted, the recording/reproducing section 18 carries out data processing such as data format conversion or compression processing to the received music data or news data as the need arises (S108). However, if data transmitted from the service provider 1 have been subjected to, for example, data compression or the like in advance, it is not necessary to carry out such data processing. Concretely, in the case where the service provider 1 transmits the music data or the like by means of data format of ATRAC (Adaptive Transform Acoustic Coding) or ATRAC2 well-known as a sound signal compression technique of a magneto-optical disk for music, it is not necessary to carry out data format conversion, compression processing, or the like at the recording/reproducing section 18. In this case, it is possible to expect simplification of functional structure at the recording/reproducing portion 18 and speeding up of processing.

After the data processing is carried out as the need arises, the recording/reproducing section 18 stores the music data or news data in the memory section 17 (S109). At this time, for the purpose of keeping security of the data in the memory section 17, the recording/reproducing section 18 may encrypts the music data or news data, or the data may be encrypted when transmitted from the service provider 1.

Like this, by storing the music data or news data in the memory section 17, the recording/reproducing section 18 completes downloading from the service provider 1. Even in the case where the music data or news data are outputted at the same time as the reception, the recording/reproducing section 18 may store the data in the memory section 17. That is, the arithmetic/control section 16 and the recording/reproducing section 18 may carry out both the output and the storage of the music data or news data at the same time.

Next, an example of processing operations in the case where the music data or news data stored in the memory section 17 in the manner described above are outputted from the input/output section 14, will be described.

Figure 4:
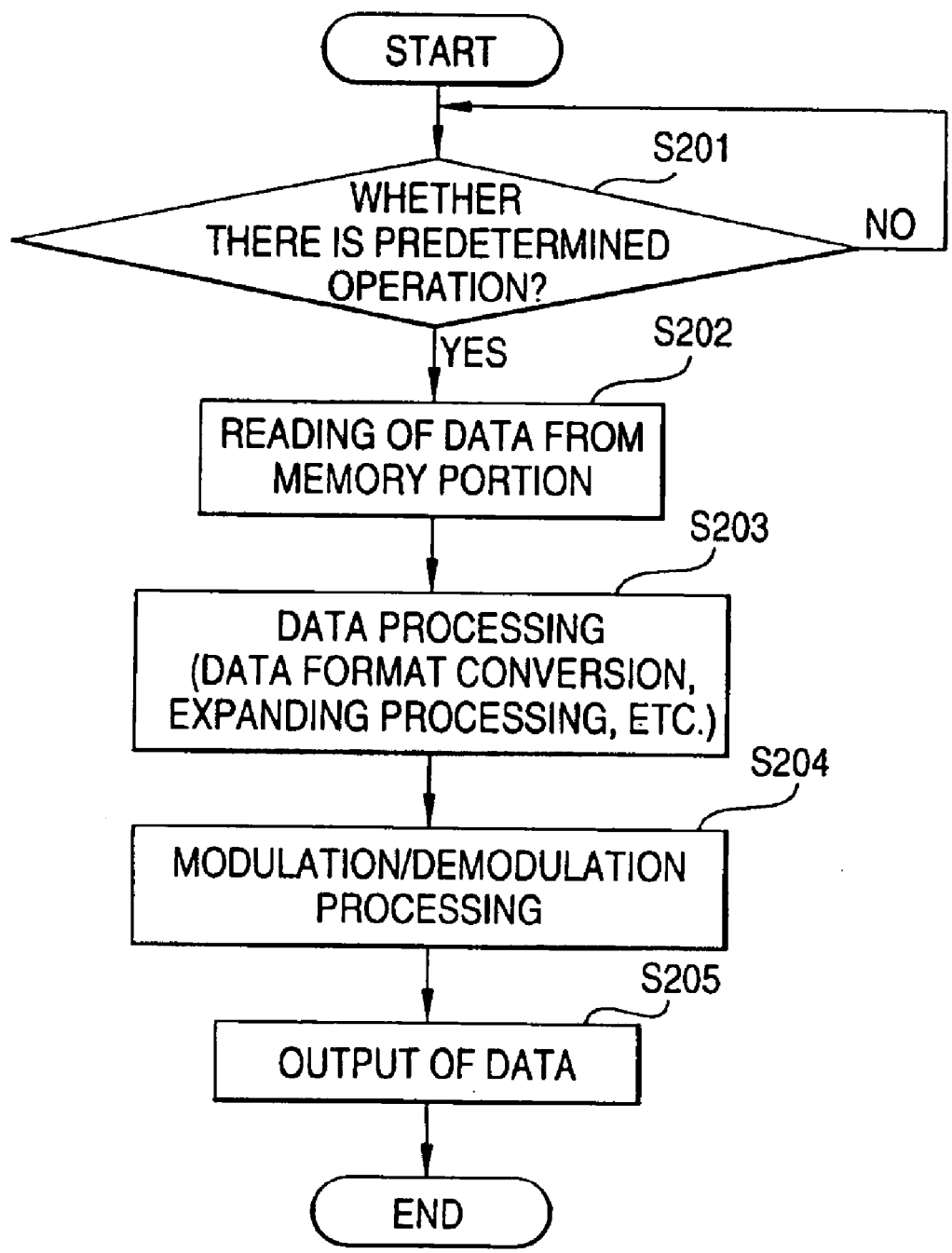
FIG. 4 is a flowchart showing an example of processing operations in the case where information stored in a memory portion is reproduced by the mobile communication apparatus of the invention.

The mobile communication apparatus 10 outputs the music data or news data in the memory section 17 in accordance with the instructions from the user. That is, in the mobile communication apparatus 10, as shown in the flowchart of FIG. 4, the arithmetic/control section 16 monitors whether or not there is a predetermined operation (operation for reproducing data) at the input/output section 14 by the user (S201), and at the time when the arithmetic/control section 16 recognizes the predetermined operation, the recording/reproducing section 18 starts to read the music data or news data from the memory section 17 (S202). At this time, the recording/reproducing section 18 carries out data processing such as data format conversion or expansion processing as the need arises (S203). However, this is carried out only in the case where data processing was carried out for the data stored in the memory section 17. When the data are encrypted, decryption is carried out.

When reading of the music data or news data from the memory section 17 is completed, after modulation/demodulation of the data is executed by the modulation/demodulation section 13 (S204), the arithmetic/control section 16 causes the data to be outputted from the input/output section 14 (S205).

In this way, in the mobile communication apparatus 10, at the time when the predetermined operation by the user is made at the input/output section 14, the music data or news data stored in the memory 17 are outputted from the input/output section 14. In the case where plural pieces of data are stored in the memory 17, the respective data may be read in a predetermined sequence or only the data specified by the predetermined operation may be read.

As described above, according to the mobile communication apparatus 10 of this embodiment and the information providing system using this mobile communication apparatus 10, the mobile communication apparatus 10 requests the service provider 1 to download data through radio communication, and at the mobile communication apparatus 10, the data are stored in the memory section 17. By this, at the mobile communication apparatus 10, data in the memory section 17 are read at an arbitrary time, and are outputted and reproduced from the input/output section 14, so that the user can obtain the data output of the desired contents at the desired time.

That is, in this information providing system, the mobile communication apparatus 10 can have not only the function as a communication device such as a telephone, but also the function as a portable sound device in which the user reproduces desired data, a portable radio receiver, or portable information terminal. Thus, if the user of the mobile communication apparatus 10 carries only the mobile communication apparatus 10, it becomes unnecessary to carry another portable sound device, portable radio receiver or portable information terminal. When the output and reproduction of downloaded data is carried out during stand-by state, the original function is not damaged, and it becomes possible to realize effective usage of the mobile communication apparatus 10. Further, since downloading is carried out through radio communication, it becomes possible to obtain data provided by the service provider irrespectively of the time and place.

In the case where especially music data are download, since downloading can be made irrespectively of the time and place, music-on-demand can be realized. Besides, when music data of digital signals are download by means of the communication system of CDMA, PDC or PHS, and the memory section 17 stores the data as the digital signals (through the data format using a well-known sound signal compression technique such as ATRAC or ATRAC2), it becomes possible to reproduce the data with high quality to the same degree as that recorded in a conventional optical disk or magneto-optical disk. Thus, it becomes possible to use this mobile communication apparatus 10 as a recording/reproducing apparatus of hi-fi audio.

On the other hand, in the case where the downloaded data are news data such as news stories, sport information, or a weather forecast, it becomes possible for the user to obtain necessary information output (news) by hearing instead of reading. Further, in general, since the data traffic of the mobile communication is less crowded in the early morning, it is conceivable, for example, like a morning edition of a newspaper, to realize a service (telephone newspaper service) in which news data are automatically and periodically distributed in a specific time.

Moreover, when the memory section 17 is made of a semiconductor memory card which can be freely attached to and detached from the main body of the mobile communication apparatus 10, it becomes possible to exchange the memory section 17 between the mobile communication apparatus 10 and other mobile communication apparatuses or other compatible devices. Thus, the user can obtain music data or news data by a method other than downloading through radio communication. That is, since it is conceivable that the semiconductor memory card in the state where music data or the like are stored therein is put on the market, the versatility as a system can be extremely increased. Further, since the semiconductor memory card is made of an IC card having a built-in nonvolatile flash ROM, the portability is extremely superior as compared with a magnetic tape, a magneto-optical disk, or the like. That is, as the memory section 17 of the mobile communication apparatus 10, in view of the versatility (connection to other devices), portability, saving of power consumption, and the like, it is most preferable to construct the memory section by the semiconductor memory card which can be freely attached and detached.

From these, the mobile communication apparatus 10 of this embodiment becomes very convenient for the user as compared with a conventional one. Besides, also at the service provider 1, that is, a communication carrier providing the service of mobile communication, it is possible to expect the improvement of services to the user and the increase of communication fees due to downloading.

In this embodiment, although the description has been made on the example where music data or news data are downloaded, the present invention is not limited to this. It is needless to say that the invention can be applied to image information, video information, and other information. Further, the mobile communication apparatus 10 can be connected to a portable personal computer or the like.

As described above, in the mobile communication apparatus of the present invention and the information providing system using this mobile communication apparatus, at the mobile communication apparatus, a request for transmission of desired information is made through radio waves to the information transmission station, transmitted information is temporarily stored, and the information is outputted and reproduced at an arbitrary time. By this, at the mobile communication apparatus, it becomes possible for the user to obtain the desired information output at the desired time. That is, if the user of the mobile communication apparatus carries only this mobile communication apparatus, the user can obtain the information output of the desired contents at the desired time, so that the apparatus becomes much more convenient than a conventional one.

What is claimed is:

1. A mobile communication apparatus, comprising:
   a) communication means for transmitting and receiving information signals to and from a base station via radio waves; said base station further transmitting and receiving information signals to and from a service provider through a public line network;
   b) input/output means for a user to interact with said mobile communication apparatus; said input/output means comprising a keypad, display means, a speaker, and a microphone;
   c) a removable semiconductor memory for storing received information signals; and
   d) processing means for encrypting the information signals prior to storage in said memory means;
   whereby said mobile communication apparatus is selectively operable to perform one of the operations of outputting received information signals at the time of reception, storing received information signals for output at a later time, and simultaneously outputting and storing received information signals; and
   whereby said mobile communication apparatus is operable to reproduce and output downloaded data when said apparatus is in a stand-by state.

2. The mobile communication apparatus according to claim 1, further comprising recording/reproducing means for recording information signals input to said memory means and for reproducing information signals stored in said memory means.

3. The mobile communication apparatus according to claim 1, wherein said public line network is the internet and said base station communicates with said service provider using a universal resource locator.

4. The mobile communication apparatus according to claim 1, wherein said input/output means further comprises a headphone device, whereby said user can listen to the information signals processed by said processing means.

5. The mobile communication apparatus according to claim 1, wherein said information signals include voice data and music data.

6. The mobile communication apparatus according to claim 1, wherein said display means comprises a liquid crystal display (LCD) having a touch sensing screen, whereby the user can input information signals by touching said touch sensing screen.

7. An information providing system, comprising:
   a service provider for transmitting and receiving information signals through a public line network;

a base station connected to said public line network for transmitting and receiving information signals to and from said service provider; and a mobile communication device, having:
- a) communication means for transmitting and receiving information signals to and from said base station via radio waves;
- b) input/output means for a user to interact with said mobile communication apparatus; said input/output means comprising a keypad, display means, a speaker, and a microphone;
- c) a removable semiconductor memory for storing received information signals; and
- d) processing means for encrypting the information signals prior to storage in said memory means;

whereby said mobile communication apparatus is selectively operable to perform one of the operations of outputting received information signals at the time of reception, storing received information signals for output at a later time, and simultaneously outputting and storing received information signals; and whereby said mobile communication apparatus is operable to reproduce and output downloaded data when said apparatus is in a stand-by state.

8. The information providing system according to claim 7, further comprising recording/reproducing means for recording information signals input to said memory means and for reproducing information signals stored in said memory means.

9. The information providing system according to claim 7, wherein said public line network is the internet and said base station communicates with said service provider using a universal resource locator.

10. The information providing system according to claim 7, wherein said input/output means further comprises a headphone device, whereby said user can listen to the information signals processed by said processing means.

11. The information providing system according to claim 7, wherein said information signals include voice data and music data.

12. The information providing system according to claim 7, wherein said display means comprises a liquid crystal display (LCD) having a touch sensing screen, whereby the user can input information signals by touching said touch sensing screen.

* * * * *